(12) United States Patent
Vasudevan et al.

(10) Patent No.: US 8,369,858 B2
(45) Date of Patent: Feb. 5, 2013

(54) COORDINATING MACRO-CELL AND PRIVATE CELL OPERATION IN OVERLAY WIRELESS NETWORKS

(75) Inventors: Subramanian Vasudevan, Morristown, NJ (US); Jialin Zou, Randolph, NJ (US)

(73) Assignee: Alcatel Lucent, Paris (FR)

( * ) Notice: Subject to any disclaimer, the term of this patent is extended or adjusted under 35 U.S.C. 154(b) by 373 days.

(21) Appl. No.: 12/612,704

(22) Filed: Nov. 5, 2009

(65) Prior Publication Data

US 2011/0105132 A1    May 5, 2011

(51) Int. Cl.
*H04W 36/00* (2009.01)
(52) U.S. Cl. .................. 455/444; 455/436; 455/437
(58) Field of Classification Search ............... 455/422.1, 455/436–444, 462, 465, 522, 63.1, 296, 456.1, 455/456.5
See application file for complete search history.

(56) References Cited

U.S. PATENT DOCUMENTS

| | | | |
|---|---|---|---|
| 6,208,869 B1 * | 3/2001 | Roberts et al. ................ 455/465 |
| 7,826,836 B2 * | 11/2010 | Rajasimman et al. ...... 455/422.1 |
| 7,929,970 B1 * | 4/2011 | Gunasekara et al. ......... 455/444 |
| 2009/0059867 A1 * | 3/2009 | Rajasimman et al. ........ 370/332 |
| 2009/0215400 A1 | 8/2009 | Chang et al. ............... 455/67.14 |
| 2009/0264155 A1 * | 10/2009 | Nakayama et al. ........... 455/561 |
| 2009/0285143 A1 * | 11/2009 | Kwun et al. .................. 370/311 |
| 2010/0035622 A1 * | 2/2010 | Ito et al. ........................ 455/450 |
| 2010/0048212 A1 * | 2/2010 | Yavuz et al. .................. 455/436 |
| 2010/0113031 A1 * | 5/2010 | Kim et al. ..................... 455/437 |
| 2010/0120394 A1 * | 5/2010 | Mia et al. ................... 455/404.2 |
| 2010/0120447 A1 * | 5/2010 | Anderson et al. .......... 455/456.1 |
| 2010/0130210 A1 * | 5/2010 | Tokgoz et al. ................ 455/437 |
| 2011/0263256 A1 * | 10/2011 | Yavuz et al. .................. 455/436 |

OTHER PUBLICATIONS

International Application No. PCT/US2010/055058 dated Apr. 1, 2011 and Written Opinion.
Mitsubishi Electric: "Dynamic Setup of HNBs for Energy Savings and Interference Reduction", 3GPP Draft; R3-081949 (Dynamic Setup HNBS), 3rd Generation Partnership Project (3GPP), Mobile Competence Centre; 650, Route Des Lucioles; F-06921; Sophia-Antipolis Cedex; France, vol. Ran WG3, no. Jeju Island; Aug. 13, 2008, XP050165010, paragraph [0002] p. 2, lines 15-22, p. 5, lines 8-14 and p. 7, lines 4-10.

* cited by examiner

*Primary Examiner* — Wesley Kim
(74) *Attorney, Agent, or Firm* — Williams, Morgan & Amerson

(57) ABSTRACT

The present application describes methods involving one or more mobile units, one or more macrocells providing wireless connectivity to one or more first coverage areas, and one or more femtocell providing wireless connectivity to one or more second coverage areas overlapping with the first coverage area(s). One embodiment of the method includes determining, at the femtocell(s), whether to transmit one or more beacon signal from the femtocell(s) on one or more carriers associated with the macrocell(s) based on whether mobile unit(s) are located within the first coverage area(s).

24 Claims, 5 Drawing Sheets

COORDINATING MACRO-CELL AND PRIVATE CELL OPERATION IN OVERLAY WIRELESS NETWORKS

BACKGROUND OF THE INVENTION

1. Field of the Invention

This invention relates generally to communication systems, and, more particularly, to wireless communication systems.

2. Description of the Related Art

Conventional wireless communication systems use a network of base stations to provide wireless connectivity to one or more mobile units. In some cases, the mobile units may initiate wireless communication with one or more base stations in the network, e.g., when the user of the mobile unit would like to initiate a voice or data call. Alternatively, the network may initiate the wireless communication link with the mobile unit. For example, in conventional hierarchical wireless communications, a server transmits voice and/or data destined for a target mobile unit to a central element such as a Radio Network Controller (RNC). The RNC may then transmit paging messages to the target mobile unit via one or more base stations or node-Bs. The target mobile unit may establish a wireless link to one or more of the base stations in response to receiving the page from the wireless communication system. A radio resource management function within the RNC receives the voice and/or data and coordinates the radio and time resources used by the set of base stations to transmit the information to the target mobile unit. The radio resource management function can perform fine grain control to allocate and release resources for broadcast transmission over a set of base stations.

A conventional base station provides wireless connectivity within a geographical region that is referred to as a cell, a macrocell, and/or a sector. Conventional base stations can transmit signals using a predetermined amount of available transmission power, which in some cases is approximately 35 W for a base station. The range of the macrocell is determined by numerous factors including the available transmission power, angular distribution of the available power, obstructions within the macrocell, environmental conditions, and the like. For example, the range of a macrocell can vary from as little as 300 m in a densely populated urban environment to as much as 100 km in a sparsely populated rural environment. The coverage area can also vary in time if any of these parameters changes.

At least in part because of the reduced cost and complexity of deployment, simplified low cost base stations may be deployed in locations that are impractical for conventional base stations. For example, a low cost base station may be deployed in a residence or building to provide wireless connectivity to the occupants of the residents of the building. Base stations deployed in a residence are typically referred to as home base stations or femtocells because they are intended to provide wireless connectivity to a much smaller area (e.g., a femtocell) that encompasses a residence. Femtocells have a much smaller power output than conventional base stations that are used to provide coverage to macrocells. For example, a typical femtocell has a transmission power on the order of 10 mW. Consequently, the range of a typical femtocell is much smaller than the range of a macrocell. For example, a typical range of a femtocell is about 100 m. Clusters of femtocells may also be deployed to provide coverage to larger areas and/or to more users.

The functionality in a femtocell is typically quite similar to the functionality implemented in a conventional base station that is intended to provide wireless connectivity to a macrocell that may cover an area of approximately a few square kilometers. A femtocell may therefore be deployed by a service provider as an integral and trusted part of a wireless network, in which case the femtocell basically operates as a base station with a relatively small range. However, femtocells may alternatively be designed to be inexpensive plug-and-play devices that can be purchased off-the-shelf and easily installed by a lay person. This type of femtocell, which is often referred to as a home femtocell, a private cell, or a home node-B, is not considered an integral or trusted part of the wireless network because it is not deployed or controlled by the service provider and is therefore vulnerable to hacking and other unauthorized uses.

Home femtocells are typically deployed as an overlay to the existing macrocellular network. The home femtocells may transmit in a different frequency channel or carrier to reduce interference with base station that support the macrocellular network. Each home femtocell may therefore transmit pilot(s) on its own serving carrier and transmit the beacon signals on all the collocated or neighboring macrocell carriers. User equipment can detect the presence of the home femtocell by searching for a beacon signal transmitted by the home femtocell in one of the carrier frequencies supported by the macrocellular network. The home femtocells can then provide wireless connectivity to registered user equipment when the user equipment comes within range of the home femtocell, detects the beacon signal, and hands off to the home femtocell. However, the macrocellular network, the home femtocell, and the user equipment can generate mutual interference. For example, when a macrocellular base station is providing power control instructions to the user equipment communicating with it, the user equipment may be instructed to increase its transmission power enough to cause interference with nearby home femtocells that operate on the same carrier. For another example, the beacon signal transmitted by the home femtocell can interfere with nearby user equipment that is using the same carrier to communicate with the macrocell. Each femtocell can also contribute to the intercell interference received by neighboring femtocells.

Conventional macrocellular systems are not configured to coordinate operation with conventional private femtocells. For example, neither conventional macrocellular systems nor conventional private femtocells gather location information to coordinate the operation. The macrocellular system and the private femtocell do not exchange user location or other user equipment information. Consequently, the private femtocell is not able to take any action it upon user equipment status in the macrocellular network. After a private femtocell is powered on, it will interfere with the overlaid macrocell and the neighboring private femtocells. Since the private femtocells are unaware of the user equipment status in the macrocellular network, the private femtocells can not be controlled adaptively to account for this variable status and more interference will be generated by the private femtocells. Moreover, hand-off delay between the macrocellular network and the private femtocells may be increased and the power consumption of the user equipment and/or private femtocells may be increased. For example, when a private femtocell is powered on and begins transmitting its beacons and pilot(s), it will cause nearby user equipment to acquire the beacon/pilot and try to access the private femtocell. Since the most of the user equipment that are passing by are not the owner of the private femtocell, the repeated try and fail activities of the user equipment are wasting user equipment power. The unnecessary private femtocell transmissions also waste power.

SUMMARY OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided involving one or more mobile units, one or more macrocells providing wireless connectivity to one or more first coverage areas, and one or more femtocell providing wireless connectivity to one or more second coverage areas overlapping with the first coverage area(s). One embodiment of the method includes determining, at the femtocell(s), whether to transmit one or more beacon signal from the femtocell(s) on one or more carriers associated with the macrocell(s) based on whether mobile unit(s) are located within the first coverage area(s).

In another embodiment, a method is provided involving one or more mobile units, one or more macrocells providing wireless connectivity to one or more first coverage areas, and one or more femtocell providing wireless connectivity to one or more second coverage areas overlapping with the first coverage area(s). One embodiment of the method includes transmitting, from the mobile unit(s) to the macrocell(s), information indicating that the mobile unit(s) are within the first coverage area(s) so that the macrocell(s) can forward the information to the femtocell(s) for determining whether to transmit one or more beacon signal(s) from the femtocell(s) on one or more carriers associated with the macrocell(s).

In yet another embodiment, a method is provided involving one or more mobile units, one or more macrocells providing wireless connectivity to one or more first coverage areas, and one or more femtocell providing wireless connectivity to one or more second coverage areas overlapping with the first coverage area(s). One embodiment of the method includes receiving, from the mobile unit(s) and at the macrocell(s), information indicating that the mobile unit(s) are within the first coverage area(s). The method also includes transmitting, from the macrocell(s) to the femtocell(s), the information to the femtocell(s) for determining whether to transmit one or more beacon signals from the femtocell(s) on one or more carriers associated with the macrocell(s).

BRIEF DESCRIPTION OF THE DRAWINGS

The disclosed subject matter may be understood by reference to the following description taken in conjunction with the accompanying drawings, in which like reference numerals identify like elements, and in which.

Figure 1:
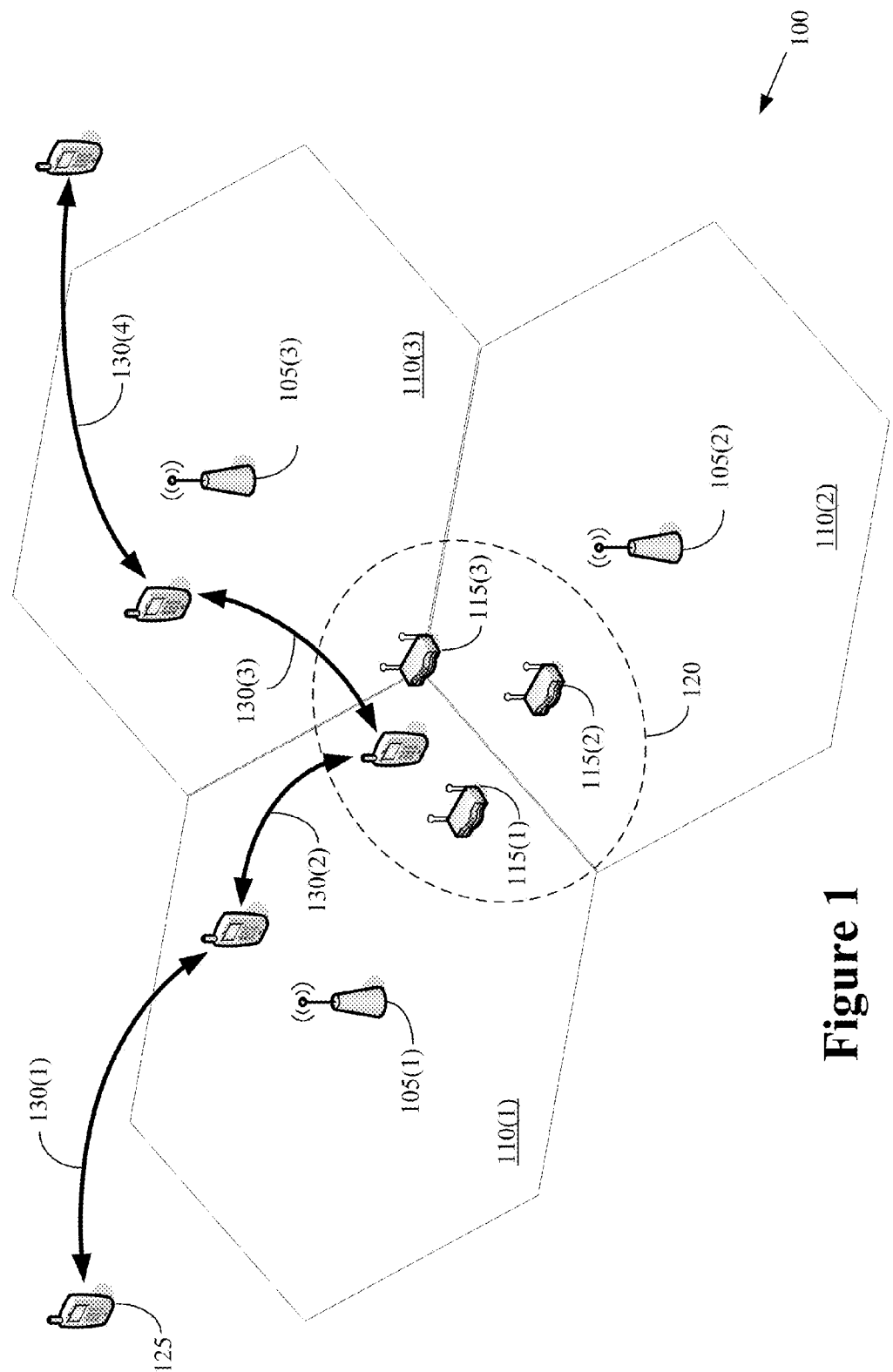
FIG. 1 conceptually illustrates a first exemplary embodiment of a wireless communication system.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates a first exemplary embodiment of a wireless communication system 100. In the illustrated embodiment, the wireless communication system 100 includes base stations 105 that are used to provide wireless connectivity to geographic areas 110 associated with the base stations 105. In accordance with conventional usage in the art, the term "macrocell" will be used to refer to the base stations 105 and/or the geographic area 110 served by the base station 105. The macrocells are depicted in FIG. 1 as idealized hexagons including a single antenna in the interest of clarity and to avoid obscuring the description. However, persons of ordinary skill in the art should appreciate that macrocells typically have an irregular and variable shape that is determined by numerous factors including, but not limited to, transmission powers of the base stations 105, transmission power distributions of the base stations 105, physical obstacles, changing environmental conditions, and the like. Moreover, the base stations 105 may include multiple antennas for providing wireless coverage to particular sectors and/or for beamforming purposes.

The wireless communication system 100 includes one or more femtocells 115 that are used to provide wireless connectivity over a relatively small geographic area 120. Portions of the coverage area 120 of the femtocells 115 shown in FIG. 1 overlap with portions of the macrocells 110. In the illustrated embodiment, the femtocell 115 is a home femtocell 115, which may also be referred to as a home e-node-B (HeNB). The femtocell 115 may be a plug-and-play type of device that can be purchased by a user and installed by the user at any location. The femtocells 115 may be public or private devices. In the illustrated embodiment, the femtocell 115(1) is a public device that is available to all users, the femtocell 115(2) is a private device that is available to a first set of registered users, and the femtocell 115(3) is a private device that is available to a second set of registered users. Techniques for registering users are known in the art and in the interest of clarity only those aspects of registering users and/or confirming registration of users that are relevant to the claimed subject matter will be discussed herein.

Mobile unit 125 or other user equipment (not shown in FIG. 1) can access the wireless communication system 100 by communicating with either the base stations 105 or the femtocells 115. In the illustrated embodiment, the macrocells 105 are administered by a service provider and so the mobile unit 125 can access the wireless communication system 100 through any of the base stations 105. For example, the base stations 105 may support wireless communication in one or more carrier frequencies and the mobile unit 125 can use up link and/or downlink channels in one or more of these carrier frequencies to communicate with the wireless communication system 100. The femtocells 115 are administered by individuals or small groups of people and so the mobile unit 125 can only communicate with femtocells 115 that are configured to offer public service or private femtocells 115 that have registered the user of the mobile unit 125. In the illustrated embodiment, the mobile unit 125 is registered with the private femtocell 115(3) and so can receive wireless service from the public femtocell 115(1) and the private femtocell 115(3).

The femtocells 115 signal their presence by transmitting or broadcasting various signals including beacon signals, pilot signals, and/or other overhead signals. In the illustrated embodiment, the mobile unit 125 can detect the presence of the femtocells 115 by monitoring beacon signals and/or pilot signals transmitted by the femtocells 115. Beacon signals differ from pilot signals because the beacon signals are transmitted on carrier frequencies that correspond to the carrier frequencies supported by the macrocells 105, which typically differ from the carrier frequencies used by the femtocells 115. In contrast, the pilot signals transmitted by a femtocell 115 are transmitted on carrier frequencies that are used by the femtocell 115 for other overhead and/or traffic channels. Transmitting a beacon signal from the femtocell 115 on a carrier frequency supported by the macrocells 105 allows the mobile unit 125 to detect the presence of the femtocell 115 while tuned for communication with the macrocells 105 over the carrier frequencies supported by the macrocells 105. However, the beacon signals transmitted by the femtocells 115 contribute interference to the macrocells 105. The femtocells 115 can therefore determine whether to broadcast a beacon signal (or other overhead signal) based on the current status and/or location of the mobile unit 125.

The femtocells 115 shown in FIG. 1 can operate in four different modes: active mode, semi-active mode, semi-sleep mode, and sleep mode. A femtocell 115 in the active mode transmits beacon signals so that mobile units in the macrocells 105 can detect the presence of the femtocell 115. An active femtocell 115 also transmits pilot signals and/or other overhead signals to maintain connections with mobile units that are camped on the femtocell 115. In the semi-active mode, a femtocell 115 transmits pilot signals and/or other overhead signals but does not transmit beacon signals. The semi-active mode is used when users are camped on the femtocell 115 and no registered users are within nearby macrocells 105. A femtocell 115 in the semi-sleep mode transmits a beacon signal to users in nearby macrocells 105 but does not transmit pilot and/or other overhead signals. Sleeping femtocells 115 do not transmit beacon signals or pilot/overhead signals.

In operation, each femtocell 115 transitions between the various modes depending on the locations and status of nearby mobile units 125. For example, the mobile unit 125 may initially be located outside of the macrocells 110 and the coverage area 120 of the femtocells 115. No other user equipment that are capable of communicating with the femtocells 115 are initially found within the macrocells 110 or the coverage area 120 of the femtocells 115. The public and private femtocells 115 are therefore initially operating in the sleep mode and so they are not broadcasting any beacon signals. Femtocells 115 that are in the sleep mode may also elect not to transmit other pilot signals and/or overhead signals. Since the beacon signals and/or other overhead signals are not being transmitted by the femtocells 115, the macrocells 105 do not experience interference from the beacon signals when the femtocells 115 are all operating in the sleep mode. Operating in the sleep mode may also help conserve power at the femtocell 115.

The mobile unit 125 then crosses into the macrocell 110(1), as indicated by the arrow 130(1). The mobile unit 125 recognizes that the macrocell 110(1) overlaps with the coverage area 120 of the femtocells 115. For example, the mobile unit 125 may use stored information indicating a mapping between the macrocells 105 and the femtocells 115 to determine when it has entered a macrocell 110 that overlaps with a femtocell 115. The mobile unit 125 transmits a message to the macrocell 110(1) indicating that it has entered the macrocell 110(1) and that it is registered to communicate with the femtocells 115(1, 3). The message may also include other status and/or location information, as will be discussed herein. The macrocell 110(1) routes this information to the appropriate femtocells 115(1, 3), thereby causing the femtocells 115(1, 3) to enter the active mode and begin transmitting beacon signals (as well as other pilot or overhead signals) so that the mobile unit 125 can detect the presence of these femtocells 115(1, 3) and potentially attach to them. The femtocell 115(2) can remain in sleep mode until registered user equipment enters one of the macrocells 110.

The mobile unit 125 may hand off from the macrocell 105(1) to one of the femtocells 115(1, 3) when the mobile unit 125 passes into the coverage area 120, as indicated by the arrow 130(2). For example, the mobile unit 125 may decide to hand off to the femtocell 115(3) based on some criterion such as a comparison of signal strengths, a threshold signal strength, and the like. Once the mobile unit 125 has handed off to the femtocell 115(3) and is camping on the femtocell 115(3), the status of the femtocell 115(3) can be modified. For example, if all of the user equipment that are registered to the femtocell 115(3) are camping on the femtocell 115(3) after the handoff, then the femtocell 115(3) can transition to the semi-active mode and turn off the beacon signals. Alternatively, is some registered user equipment are in the macrocells 105 but not camping on the femtocell 115(3), the femtocell 115(3) can remain in the active mode.

If the mobile unit 125 leaves the coverage area 120 and hands off to another macrocell 105(3), as indicated by the arrow 130(3), the femtocell 115(3) can modify its operating mode. For example, if no other user equipment are camping on the femtocell 115(3) after the hand off, it can transition to the semi-sleeping mode. The mobile unit 125 can also send a location update message as soon as it hands off to an entity outside of the macrocell 105(3) or out of the current paging zone. The message type may indicate that the mobile unit 125 is away from its registered femtocell 115(3). The message can also include an identifier indicating the registered femtocell 115(3). The operating mode of the femtocell 115(3) can be modified when the mobile unit 125 leaves the overlapping macrocells 105, as indicated by the arrow 130(4). For example, if no other user equipment registered with the femtocell 115(3) are present in the overlapping macrocells 105, then the femtocell 115(3) transitions back to the sleep mode when the mobile unit 125 leaves the overlapping macrocells 105.

Figure 2:
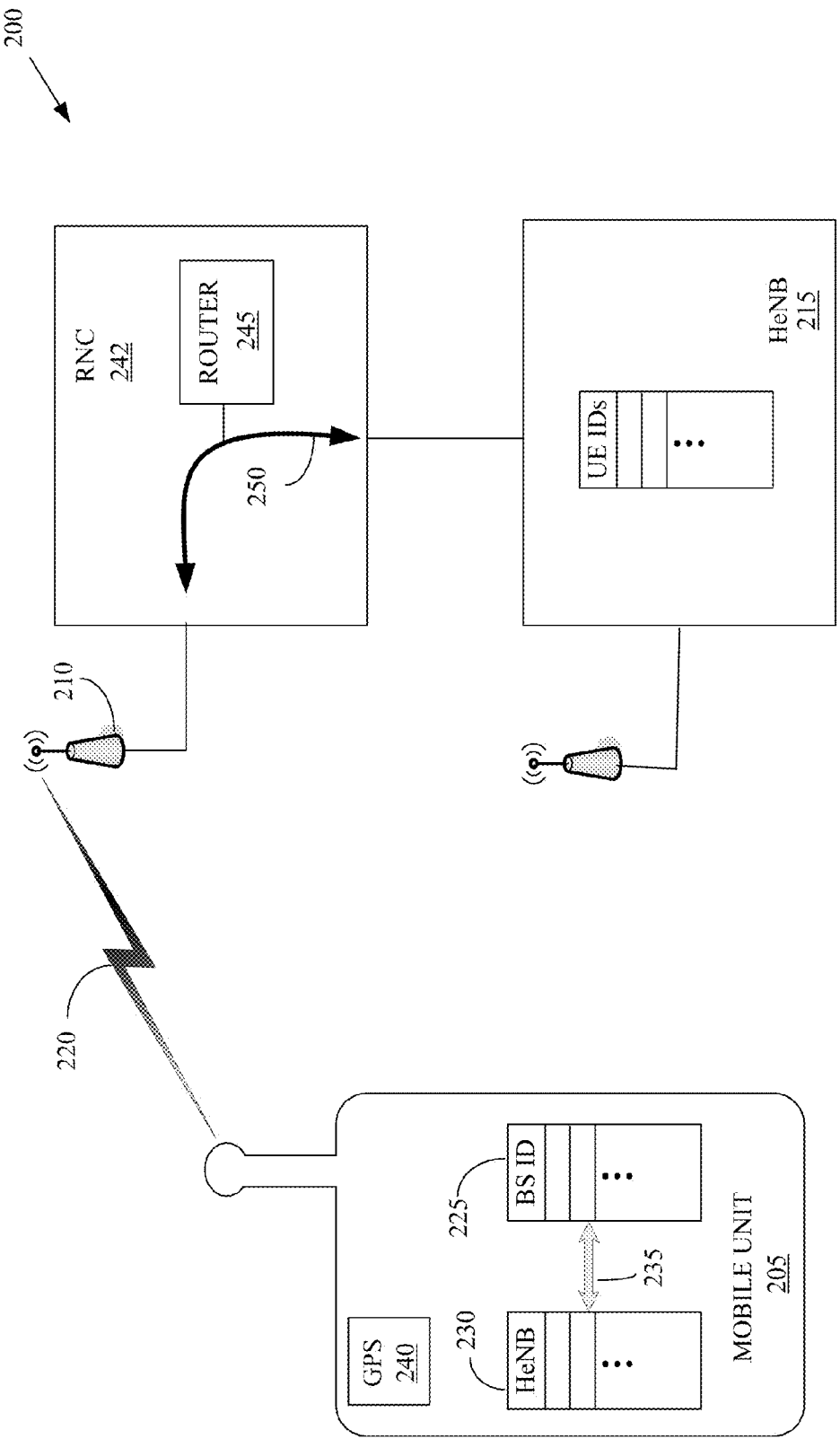
FIG. 2 conceptually illustrates a second exemplary embodiment of a wireless communication system.

FIG. 2 conceptually illustrates a second exemplary embodiment of a wireless communication system 200. In the second exemplary embodiment, the wireless communication system 200 includes a mobile unit 205, a base station 210 for providing wireless coverage to a macrocell, and a HeNB 215 for providing wireless coverage to a femtocell. The mobile unit 205 can communicate with the base station 210 over an air interface 220 and the base station 210 is communicatively coupled (e.g., through a core network) to the HeNB 215. The mobile unit 205 can also communicate directly with the HeNB 215 over another air interface (not shown in FIG. 2). Location and/or other status information related to the mobile units 205 can therefore be communicated to elements in the macrocellular network and the femtocell network.

The mobile unit 205 maintains a list or database 225 including the identities of the macrocells that overlap with the femtocells that are available to the mobile unit 205. The mobile unit 205 also includes a list or database 230 that includes the identities of the private HeNBs that are registered with the mobile unit 205. The information in the databases 225, 230 can be mapped to one another (as indicated by the double-headed arrow 235) so that the mobile unit 205 can determine which macrocells overlap with femtocells and vice versa. The mobile unit 205 transmits a location update message over the air interface 220 when the mobile unit 205 reads an overhead message broadcast by the base station 210 indicating that the mobile unit 205 is entering a macrocell that covers one or more of its private HeNBs 215. The location update message can have a type field that is set to indicate that the HeNB 215 should wake up. Optionally, the HeNB 215 can implement an acknowledgment mechanism that allows the mobile unit 205 to retransmit the location update message until the location update messages successfully received or an upper limit on the number of retries is reached. The mobile unit 205 can also transmit a location update message when it hands off from the HeNB 215 to another macrocell.

Figure 3:
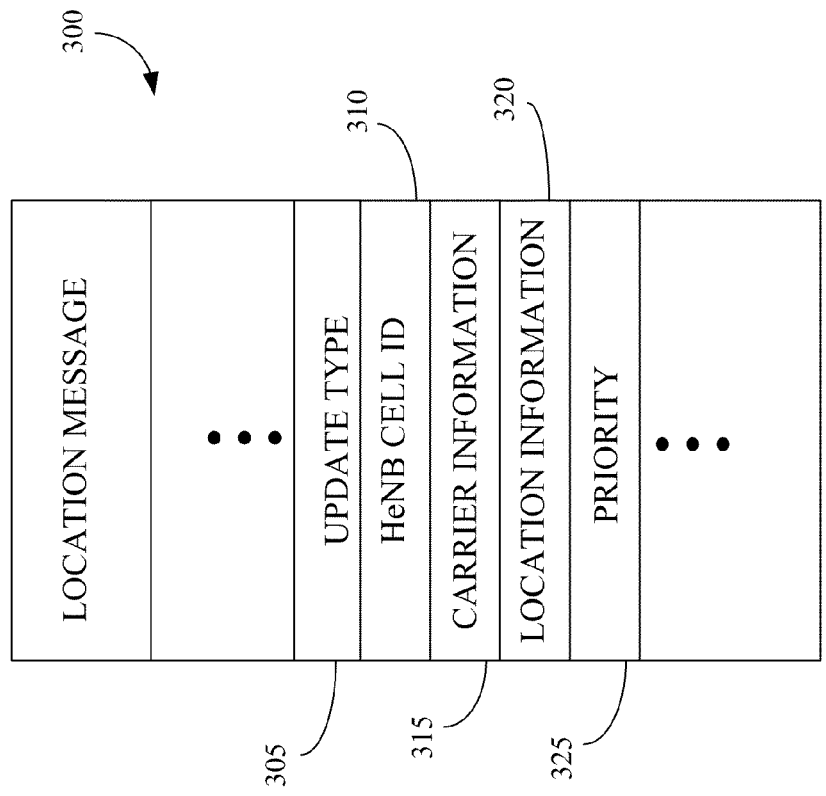
FIG. 3 conceptually illustrates one exemplary embodiment of a location message.

FIG. 3 conceptually illustrates one exemplary embodiment of a location message 300. In the illustrated embodiment, the location message 300 includes a field 305 that is used for indicating an update type of the location message 300. Exemplary update types include "wake up HeNB," "away from HeNB," "away from overlapping macrocell," and the like. The location message 300 also includes a field 310 that is used to indicate one or more cell identifiers for the registered HeNBs of the mobile unit that transmits the location message. A field 315 can be used to indicate the carrier or carriers including the band class and the frequency of the carrier(s) that are being used by the mobile unit. A femtocell can use this information to selectively transmit a beacon signal only on the carrier or carriers that are being used by the mobile unit. This option can help avoid generating interference by transmitting beacon signals on carriers that may not be monitored by the mobile unit. Field 320 in the location message 300 may be used to transmit location information for the mobile unit, such as latitude, longitude, altitude, or other coordinates that can be determined, e.g., using Global Positioning System (GPS) functionality implemented in the mobile unit. Reporting the field 320 is part of the mobile unit's location tracking mechanisms. Mobile units that implement GPS functionality can build and send the access network a report of the locations it has visited. These reports can be sent periodically or per request from the network. It can also include information indicating how long the mobile unit has been at or near the reported location. A priority associated with the mobile unit can be transmitted in the field 325.

Referring back to FIG. 2, the mobile unit 205 includes a GPS element 240 that is used to gather location information for the mobile unit 205. In one embodiment, the location information can be recorded periodically, e.g., once every 5 seconds, and stored in the mobile units 205 until it is reported back to the network. The reports may be generated and transmitted upon request or periodically, e.g., once a day. Reports of the location of the mobile unit 205 can also include information indicating how long the mobile unit 205 has been at or near the location. This information can include a measured time interval or, alternatively, a number of counts indicating how many times the measured location remained substantially constant at or near the current location. Using the GPS 240 can improve the resolution of the location information compared to simply knowing that the mobile unit 205 is in a particular macrocell or femtocell. The mobile unit location information could be used to configure the radio resources provided by the base station 210 and/or the HeNB 215. In some embodiments, this information could also be used to build personalized paging zones for paging and/or messaging, building a user equipment density map based on active and/or idle user equipment, and the like.

The messages or reports transmitted by the mobile unit 205 (or the information included therein) can be routed from the mobile units 205 to the appropriate registered HeNB 215. In the illustrated embodiment, the base station 210 communicates with a radio network controller 242 that includes a router 245. However, in alternative embodiments, the router 245 may be implanted in other entities or may be a stand-alone device. The router 245 can detect messages transmitted by the mobile units 205 ad determine whether they should be forwarded to the HeNB 215. For example, the routing function 245 can read the HeNB identifier information in the message and use the identifier to route the message to the target HeNB 215 indicated by the identifier. The router 245 can then provide a path 250 that can convey the message to the HeNB 215. Persons of ordinary skill in the art should appreciate that the path 250 may be a connection that passes the message substantially verbatim or it may be a virtual path that conveys the substance of the information included in the message to the HeNB 215. The radio network controller 242 and/or the base station 210 can perform any required preparation and/or registration for the HeNB 215 when it receives the location update message from the mobile unit 205. The radio network controller 242 and/or the base station 210 can also use the user equipment identifier to route acknowledgments from the HeNB 215 back to the mobile unit 205.

The HeNB 215 is configured to operate in four modes: active mode, semi-active mode, semi-sleeping mode, and full sleeping mode. However, persons of ordinary skill in the art having benefit of the present disclosure should appreciate that more or fewer modes can be implemented in the HeNB 215, which can transition between the different modes based on different criteria. In the illustrated embodiment, the HeNB 215 turns on its beacon signal on one or more carrier frequencies when it receives a wake-up message from registered user equipment such as the mobile unit 205. The carrier frequencies can be selected to correspond to the carriers used by the mobile unit 205 and indicated in the location update message. If the mobile unit 205 hands off from the HeNB 215 to the base station 210, the original HeNB 215 may turn on its beacon signal for the target carrier used by the mobile unit 205 and the base station 210. The HeNB 215 can also turn off its beacon signals for any carriers that do not have attached and registered user equipment when the mobile units 205 transmits a location update message indicating that it has moved away from the HeNB 215. The HeNB 215 may turn off all beacon signals when all registered user equipment are attached to the HeNB 215 since there should be no user equipment that need to use the beacon signals in this state. When no registered user equipment are attached to the HeNB 215 and no registered user equipment are located in overlapping macrocells, the HeNB 215 can transition to the sleeping mode and stop transmission of beacon signals, pilot signals, overhead messages, and the like. A sleeping HeNB 215 may also stop monitoring access channels.

In some embodiments, the HeNB 215 can also modify the transmission power and/or power distribution based on the information included in the location registration message that is transmitted to a macrocell and then forwarded to the HeNB 215. For example, the HeNB can increase or decrease its transmission power for the beacon signals, pilot signals, overhead signals, and/or traffic channels based on the user equipment priority indicated in the location registration message so that higher priority user equipment get increased transmission powers. If the HeNB 215 includes multiple antennas, then beamforming may be used (in conjunction with location information transmitted by the user equipment or determined in the network) to preferentially direct the beam pattern towards user equipment that have higher priorities. In one embodiment, macrocells may be able to determine a round-trip delay from the user equipment to the HeNB 215, in which case this information can be used to accelerate acquisition of the user equipment by the HeNB 215.

The wireless communication system 200 may also be able to override the operating mode of the public and/or private HeNBs 215. In one embodiment, the wireless communication system 200 may have the ability to require all HeNBs 215 to provide wireless connectivity to all mobile units 205. For example, in emergency situations the wireless communication system 200 may be configured to provide as much wireless connectivity as possible and in this situation the wireless communication system 200 may assume control of all available base stations 210 and HeNBs 215. The wireless communication system 200 may therefore manage the radio resources of all of these devices to provide maximal coverage and/or throughput in emergency situations. Managing the resources may include performing actions such as changing private femtocells to public femtocells, enabling or disabling private femtocells, adjusting the beacon power of the femtocells, adjusting the coverage range and/or shape of the coverage area of the femtocell, and the like. The wireless communication system 200 may turn on or turn off public HeNBs based on factors such as the distribution of the loading of the system. For example, the wireless communication system 200 could use accurate location information reported by every user to construct a user density map. The user density map may then be used to guide the resource allocation from the network, including turning overlaid femtocells on/off, turning additional carriers on/off, beamforming, making transmission power adjustments, and the like. For another example, the loading distribution on a per sector basis could be used as the basis for the decision and/or idle traffic could be estimated using the location updates transmitted by user equipment.

Figure 4:
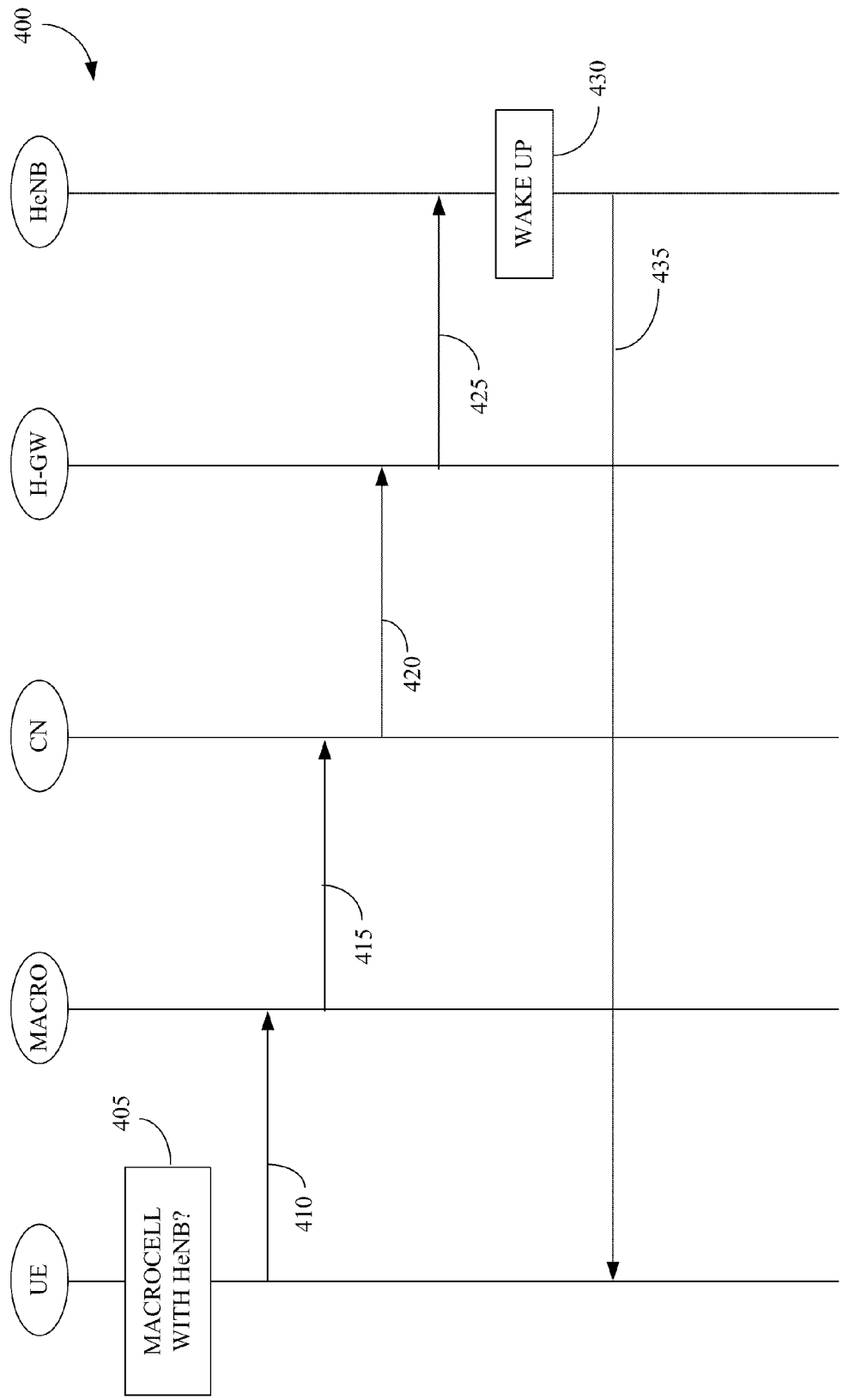
FIG. 4 conceptually illustrates one exemplary embodiment of a method of waking up a femtocell when user equipment enters a macrocell that overlaps the coverage area of the femtocell.

FIG. 4 conceptually illustrates one exemplary embodiment of a method 400 of waking up a femtocell (HeNB) when user equipment (UE) enters a macrocell (MACRO) that overlaps the coverage area of the femtocell. In the illustrated embodiment, user government monitors overhead information that can be broadcast by macrocells in the wireless communication system. If the user equipment detects (at 405) the identifier of a macrocell that maps to a registered femtocell, the user equipment sends (at 410) a message such as a location update/registration message to the macrocell. The message (or the information conveyed by the message) is then forwarded (at 415) from the macrocell to the core network (CN), which conveys (at 420) the message to a gateway (H-GW) to the femtocell communication system. The gateway can use an identifier of the femtocell that is embedded in the message to route (at 425) the information to the target femtocell. Upon receipt of the message, the femtocell identifies the user equipment as a registered user and wakes up (at 430). In embodiments that implement an acknowledgment protocol, the femtocell can return (at 435) an acknowledgment to the user equipment.

Figure 5:
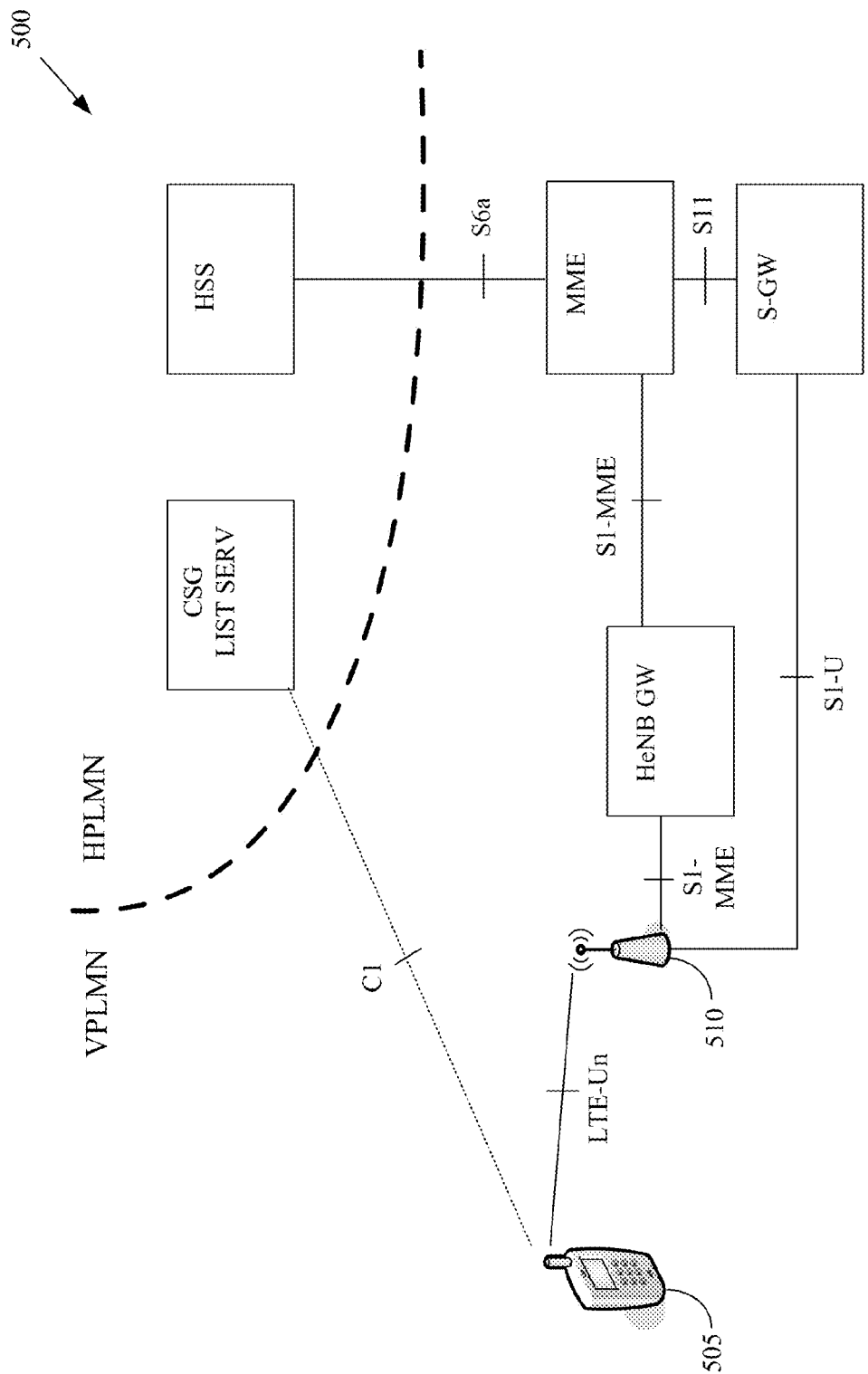
FIG. 5 conceptually illustrates a third exemplary embodiment of a wireless communication system.

FIG. 5 conceptually illustrates a third exemplary embodiment of a wireless communication system 500. In the illustrated embodiment, the wireless communication system 500 encompasses both a home public land mobile network (HPLMN) and one or more visited public land mobile networks (VPLMN). Persons of ordinary skill in the art having benefit of the present disclosure should appreciate that the public land mobile networks may be interconnected with other networks such as public switched telephone networks, which are not shown in FIG. 5 to avoid obscuring the present description. The wireless communication system 500 is used to provide wireless connectivity to one or more mobile units 505. In the illustrated embodiment, the mobile unit 505 is roaming to the VPLMN and accesses the wireless communication system 500 using an air interface to a femtocell or HeNB 510 in the VPLMN. For example, the air interface may be an LTE-Un interface established according to Long Term Evolution (LTE) standards and/or protocols.

The HeNB 510 can communicate with a gateway (HeNB GW) 515 over an interface such as the S1-MME interface defined by the LTE standards. The HeNB 510 can also communicate with a serving gateway (S-GW) 520 over an interface such as the S1-U interface defined by the LTE standards. The gateways 515, 520 communicate with the mobility management entity (MME) 525 over corresponding interfaces such as the S1-MME and S11 interfaces defined by the LTE standards. The mobility management entity 525 in the VPLMN can communicate with the home subscription server (HSS) 530 in the HPLMN. The mobile unit 505 can also communicate with a closed subscriber group (CSG) 535 in the HPLMN over a C1 interface. The interfaces and entities described in this architecture can be used to convey the information that is used to implement the multi-mode femtocell operation described herein.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method involving at least one mobile unit, at least one macrocell providing wireless connectivity to at least one first coverage area, and a femtocell providing wireless connectivity to a second coverage area overlapping with said at least one first coverage area, comprising:
   determining, at the femtocell, whether to transmit at least one beacon signal from the femtocell on at least one carrier associated with said at least one macrocell in response to receiving information from said at least one macrocell indicating whether said at least one mobile unit is located within said at least one first coverage area, wherein said information is transmitted from said at least one macrocell in response to a first message received from said at least one mobile unit, wherein the first message is transmitted in response to said at least one mobile unit detecting, in information broadcast by said at least one macrocell, a macrocell identifier that maps to the femtocell.

2. The method of claim 1, wherein determining whether to transmit said at least one beacon signal comprises determining not to transmit said at least one beacon signal from the femtocell when said at least one mobile unit is not located in said at least one first coverage area.

3. The method of claim 1, wherein determining whether to transmit said at least one beacon signal comprises:
   determining to transmit said at least one beacon signal when said at least one mobile unit is located within said at least one first coverage area; and
   transmitting, from the femtocell, said at least one beacon signal on said at least one carrier associated with said at least one macrocell.

4. The method of claim 3, wherein determining to transmit said at least one beacon signal comprises determining to transmit said at least one beacon signal in response to receiving information at the femtocell indicating that said at least one mobile unit is located within said at least one first coverage area.

5. The method of claim 4, wherein receiving said information at the femtocell comprises receiving said information from said at least one macrocell in response to said at least one macrocell receiving a location update message from said at least one mobile unit, the location update message indicating that said at least one mobile unit is located within said at least one first coverage area.

6. The method of claim 5, wherein receiving said information comprises receiving information indicating at least one of an identifier of the femtocell, at least one carrier used by said at least one mobile unit, a priority of said at least one mobile unit, or a location of said at least one mobile unit.

7. The method of claim 3, wherein said at least one carrier comprises a plurality of carriers, and wherein said at least one mobile unit is attached to said at least one macrocell using one of the plurality of carriers, and wherein transmitting said at least one beacon signal comprises transmitting said at least one beacon signal on said one of the plurality of carriers.

8. The method of claim 1, wherein said at least one mobile unit comprises a plurality of mobile units that are registered with the femtocell, and wherein determining whether to transmit said at least one beacon signal from the femtocell comprises determining whether to transmit said at least one beacon signal based on whether the plurality of registered mobile units are within said at least one first coverage area.

9. The method of claim 8, wherein determining whether to transmit said at least one beacon signal comprises determining not to transmit said at least one beacon signal when none of the plurality of registered mobile units are within said at least one first coverage area.

10. The method of claim 8, wherein determining whether to transmit said at least one beacon signal comprises determining to transmit said at least one beacon signal when at least one of the plurality of registered mobile units is within said at least one first coverage area.

11. The method of claim 1, wherein determining whether to transmit said at least one beacon signal comprises determining to transmit said at least one beacon signal and one or more overhead signals independent of whether said at least one mobile unit is within said at least one first coverage area under at least one of a predetermined emergency condition or a condition set forth in a negotiated agreement between operators of said at least one macrocell and said at least one femtocell.

12. The method of claim 1, comprising transmitting said at least one beacon signal and at least one overhead signal when the femtocell determines to transmit said at least one beacon signal and said at least one overhead signals because said at least one mobile unit is located within said at least one first coverage area.

13. The method of claim 12, comprising modifying a transmission power for transmitting said at least one beacon signal and said at least one overhead signal based on a priority associated with said at least one mobile unit.

14. The method of claim 12, comprising modifying an antenna configuration used by the femtocell for beamforming said at least one beacon signal and said at least one overhead signal towards the mobile unit based on a determined location of the mobile unit within said at least one first coverage area.

15. A method involving at least one mobile unit, at least one macrocell providing wireless connectivity to at least one first coverage area, and a femtocell providing wireless connectivity to a second coverage area overlapping with said at least one first coverage area, comprising:
determining, at the femtocell, whether to transmit at least one beacon signal from the femtocell on at least one carrier associated with said at least one macrocell based on whether said at least one mobile unit is located within said at least one first coverage area, wherein said at least one mobile unit comprises a plurality of mobile units that are registered with the femtocell, and wherein determining whether to transmit said at least one beacon signal from the femtocell comprises determining whether to transmit said at least one beacon signal based on whether the plurality of registered mobile units are within said at least one first coverage area, and wherein determining whether to transmit said at least one beacon signal comprises determining to transmit said at least one beacon signal when at least one of the plurality of registered mobile units is within said at least one first coverage area, and wherein determining whether to transmit said at least one beacon signal comprises determining not to transmit said at least one beacon signal when all of the plurality of registered mobile units are attached to the femtocell.

16. A method involving at least one mobile unit, at least one macrocell providing wireless connectivity to at least one first coverage area, and a femtocell providing wireless connectivity to a second coverage area overlapping with said at least one first coverage area, comprising:
determining, at the femtocell, whether to transmit at least one beacon signal from the femtocell on at least one carrier associated with said at least one macrocell based on whether said at least one mobile unit is located within said at least one first coverage area; and
transmitting said at least one beacon signal and at least one overhead signal when the femtocell determines to transmit said at least one beacon signal and said at least one overhead signals because said at least one mobile unit is located within said at least one first coverage area, wherein transmitting said at least one beacon signal and said at least one overhead signal comprises allocating resources for said transmission by:
receiving, from the mobile unit, information indicating at least one location visited by the mobile unit and at least one accumulated time spent by the mobile unit at said at least one location, wherein said information is received per network request or after a selected period of time;
determining at least one of a user density or a traffic loading estimation; and
performing at least one of beam forming, turning on or turning off load sharing, or turning on or turning off additional carriers based on said at least one of the user density or the traffic loading estimation.

17. A method involving a mobile unit, at least one macrocell providing wireless connectivity to at least one first coverage area, and at least one femtocell providing wireless connectivity to at least one second coverage area overlapping with said at least one first coverage area, comprising:
detecting, at the mobile unit, a macrocell identifier in information broadcast by said at least one macrocell;
mapping, at the mobile unit, the macrocell identifier to said at least one femtocell; and
transmitting, from the mobile unit to said at least one macrocell in response to said mapping, information indicating that the mobile unit is within said at least one first coverage area so that said at least one macrocell can forward said information to said at least one femtocell for determining, at said at least one femtocell, whether to transmit at least one beacon signal from said at least one femtocell on at least one carrier associated with said at least one macrocell.

18. The method of claim 17, wherein transmitting said information comprises transmitting a location update message including information indicating at least one of an identifier of said at least one femtocell, at least one carrier used by the mobile unit, a priority of the mobile unit, or a location of the mobile unit.

19. The method of claim 18, wherein said at least one femtocell comprises a plurality of femtocells and said at least one macrocell comprises a plurality of macrocells, and comprising maintaining, at the mobile unit, a list indicating that the mobile unit is registered with a subset of the plurality of femtocells and information indicating a mapping of each femtocell in the subset of the plurality of femtocells to each macrocell that includes the femtocell.

20. The method of claim 19, wherein transmitting said information comprises transmitting said information when the mobile unit enters a macrocell that includes one of the subset of the plurality of femtocells as indicated by the mapping performed by the mobile unit.

21. The method of claim 20, comprising:
determining that the mobile unit has left the macrocell that includes one of the subset of the plurality of femtocells and entered a target macrocell that does not include one of the subset of the plurality of femtocells as indicated by the mapping performed by the mobile unit; and
selecting a new carrier if the target macrocell includes at least one femtocell that is not in the subset.

22. A method involving at least one mobile unit, a macrocell providing wireless connectivity to a first coverage area, and at least one femtocell providing wireless connectivity to at least one second coverage area overlapping with the first coverage area, comprising:
broadcasting, from the macrocell, a macrocell identifier;
receiving, from said at least one mobile unit and at the macrocell, information indicating that said at least one mobile unit is within the first coverage area in response to said at least one mobile unit mapping the macrocell identifier to said at least one femtocell; and
transmitting, from the macrocell to said at least one femtocell, said information to said at least one femtocell for determining, at said at least one femtocell, whether to transmit at least one beacon signal from said at least one femtocell on at least one carrier associated with the macrocell.

23. The method of claim 22, wherein receiving said information comprises receiving a location update message including information indicating at least one of an identifier of said at least one femtocell, at least one carrier used by said at least one mobile unit, a priority of said at least one mobile unit, or a location of said at least one mobile unit.

24. The method of claim 23, wherein transmitting said information comprises transmitting said information indicating at least one of the identifier of said at least one femtocell, said at least one carrier used by said at least one mobile unit, the priority of said at least one mobile unit, or the location of said at least one mobile unit.

* * * * *